(12) United States Patent
Hsu et al.

(10) Patent No.: US 7,144,118 B2
(45) Date of Patent: Dec. 5, 2006

(54) INTAKE STRUCTURE

(75) Inventors: Nien-Hui Hsu, Miao-Li County (TW); Shang-Hsuang Wu, Miao-Li County (TW); Wen-Hsien Su, Miao-Li County (TW)

(73) Assignee: Coretronic Corporation, Hsinchu (TW)

( * ) Notice: Subject to any disclaimer, the term of this patent is extended or adjusted under 35 U.S.C. 154(b) by 0 days.

(21) Appl. No.: 10/709,710

(22) Filed: May 24, 2004

(65) Prior Publication Data
US 2004/0263798 A1 Dec. 30, 2004

(30) Foreign Application Priority Data
Jun. 24, 2003 (TW) ............... 92211591 U

(51) Int. Cl.
*G03B 21/16* (2006.01)
*G03B 21/18* (2006.01)
(52) U.S. Cl. ............... 353/61; 353/57; 353/60
(58) Field of Classification Search .......... 353/61, 353/52, 57, 58, 60, 119, 122; 348/748; 349/161
See application file for complete search history.

(56) References Cited

U.S. PATENT DOCUMENTS

| 5,951,136 | A * | 9/1999 | Furuhata et al. ........ 353/31 |
|---|---|---|---|
| 6,280,038 | B1 * | 8/2001 | Fuse et al. ........ 353/57 |
| 6,334,686 | B1 * | 1/2002 | Shiraishi et al. ........ 353/57 |
| 6,345,896 | B1 | 2/2002 | Kurosawa |
| 2002/0163627 | A1 * | 11/2002 | Ohishi et al. ........ 353/58 |
| 2002/0180938 | A1 * | 12/2002 | Bok ........ 353/52 |
| 2003/0189694 | A1 * | 10/2003 | Yamada et al. ........ 353/77 |

FOREIGN PATENT DOCUMENTS

TW   468801   12/2001

* cited by examiner

*Primary Examiner*—W. B. Perkey
*Assistant Examiner*—Rochelle Blackman
(74) *Attorney, Agent, or Firm*—Winston Hsu

(57) ABSTRACT

An intake structure, installed in a projection apparatus having heating elements, includes an intake port on the casing, air duct and an exhaust fan near the heating elements. The inlet of the air duct is connected to the intake port, and the outlet is disposed at a side of the heating elements. The air stream from the intake port is directed though the air duct for concentrating the air stream to the heating elements inside of the projection apparatus. Thus, it can be provided the maximum cooling effect and enhanced cooling efficiency for heating elements.

14 Claims, 7 Drawing Sheets

INTAKE STRUCTURE

BACKGROUND OF INVENTION

1. Field of the Invention

The present invention relates to an intake structure, and more particularly to an intake structure that is applied to projection devices thereon.

2. Description of the Prior Art

Referring now to FIGS. 1, 2 and 3, conventional intake structure 11 of projecting device 10 is set plural intake ports 111 on bottom lid 12 of the projecting device 10. An exhaust fan 112 and heating elements 13 (for examples, integration rod, relay lens and condenser, etc.) inside an optical engine case 14 are installed near the intake ports 111. The air stream from the intake ports 111 inlets inside the projecting device 10 and flows around the heating elements 13 for cooling them while the exhaust fan 112 is on.

However, there has no guiding design between the intake ports 111 and the exhaust fan 112. Therefore, the air stream passes the shortest or the lowest air-resistant ways freely into the exhaust fan 112; It renders the air stream not concentrated on the heating elements 13 to provide maximum cooling effect. The present ways to solve the problems above are to increase exhaust fans, rotating speed or area of the intake ports 111 to increase the volume of the air stream; it enhances cooling efficiency of heating element 13. But these manners render the light and noise inside the projecting device 10 to escape cape from the intake ports 111 easily. Thus, the noise of the exhaust fan enhances and influences our audiovisual enjoyment.

SUMMARY OF INVENTION

A primary object of the present invention is to provide an intake structure that utilizes an air duct to concentrate the air stream without increasing exhaust fans or rotating speed to provide the maximum cooling effect for heating elements and decrease temperature of the heating elements.

Another object of the present invention is to provide an intake structure that utilizes an air duct to guide air stream flowing around the heating elements and renders the cooling air directly flowing to the heating elements to force convection in order to increase cooling efficiency.

The other object of the present invention is to provide an intake structure that utilizes an air duct to decrease the area of the intake ports to avoid the escaping light and noise.

To achieve the above objects, the intake structure of the present invention installed in a projection apparatus having heating elements, includes an intake port on the casing, an air duct and an exhaust fan near the heating elements. The inlet of the air duct is connected to the intake port, and the outlet is disposed at one side of the heating elements. By utilizing the inletting by exhaust fan, which renders the internal air pressure of the projection apparatus lower than the external's pressure, the outside air stream from the intake port is directed though the air duct for concentrating the air stream to the heating elements inside of the projection apparatus. Thus, it can be provided the maximum cooling effect and enhanced cooling efficiency for heating elements.

DETAILED DESCRIPTION

Figure 1:
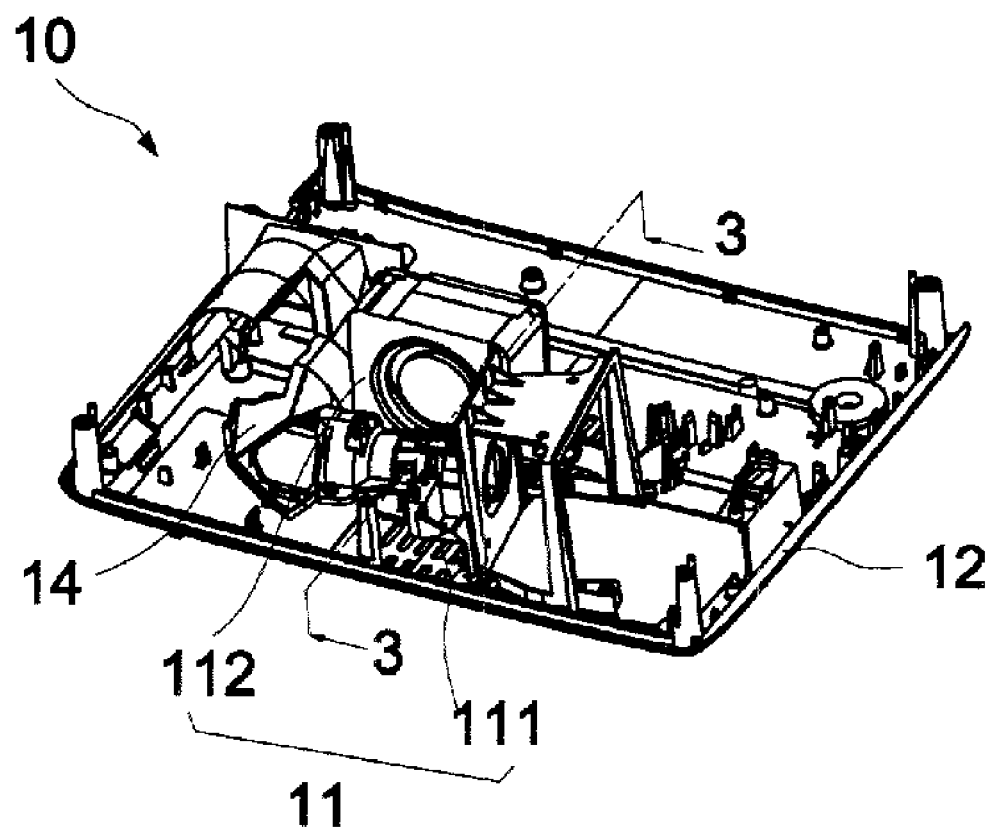
FIG. 1 is a perspective view of intake structure of a projecting device according to the conventional invention.
Figure 2:
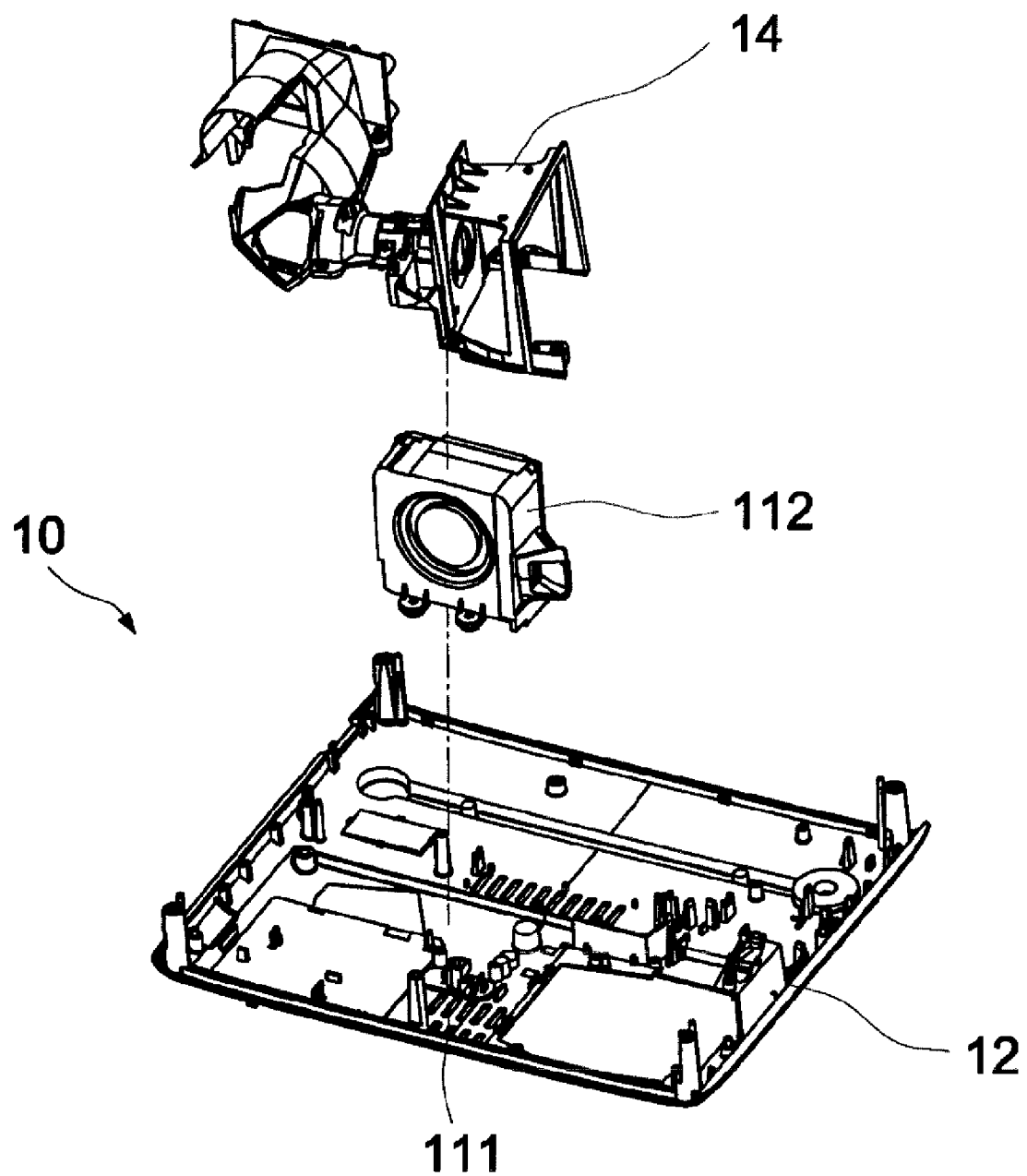
FIG. 2 is an exploded perspective view of intake structure of a projecting device according to the conventional invention.
Figure 3:
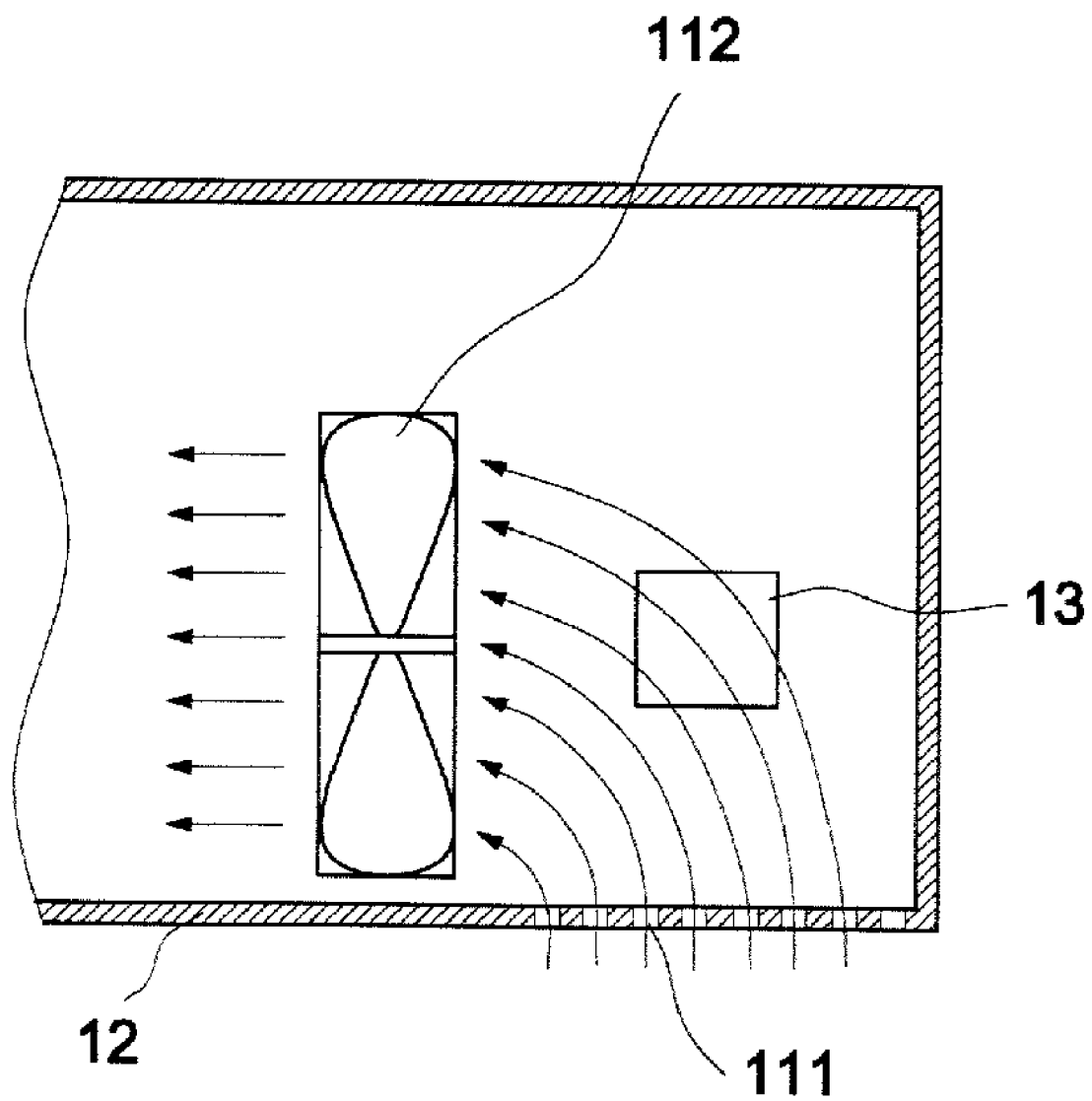
FIG. 3 is an air flowing diagram of intake structure of a projecting device according to the conventional invention.
Figure 4:
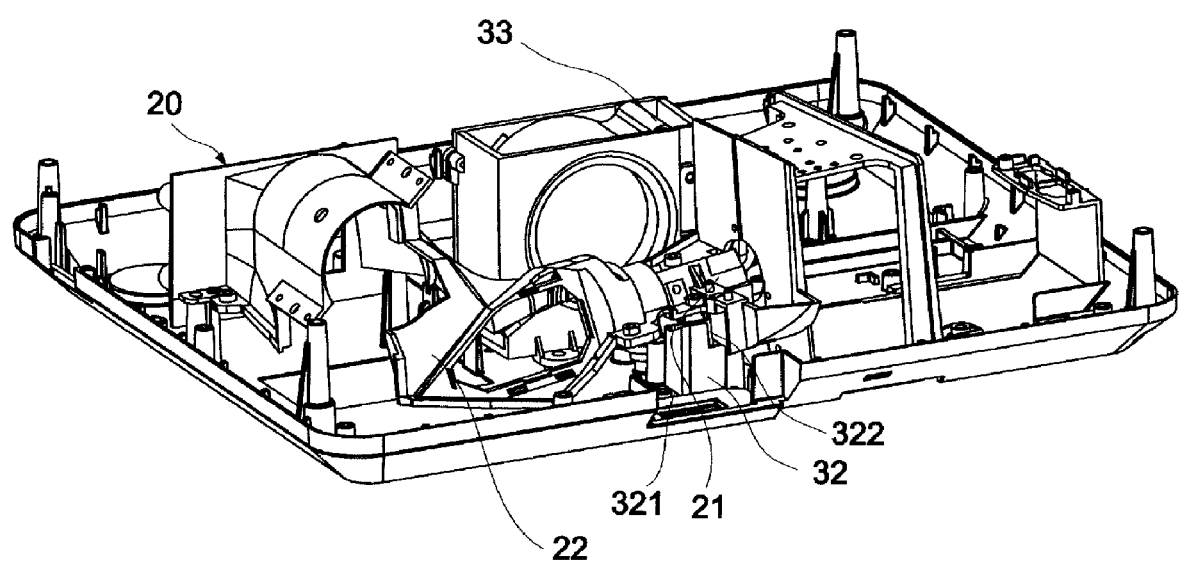
FIG. 4 is a perspective view of intake structure according to the present invention.
Figure 5:
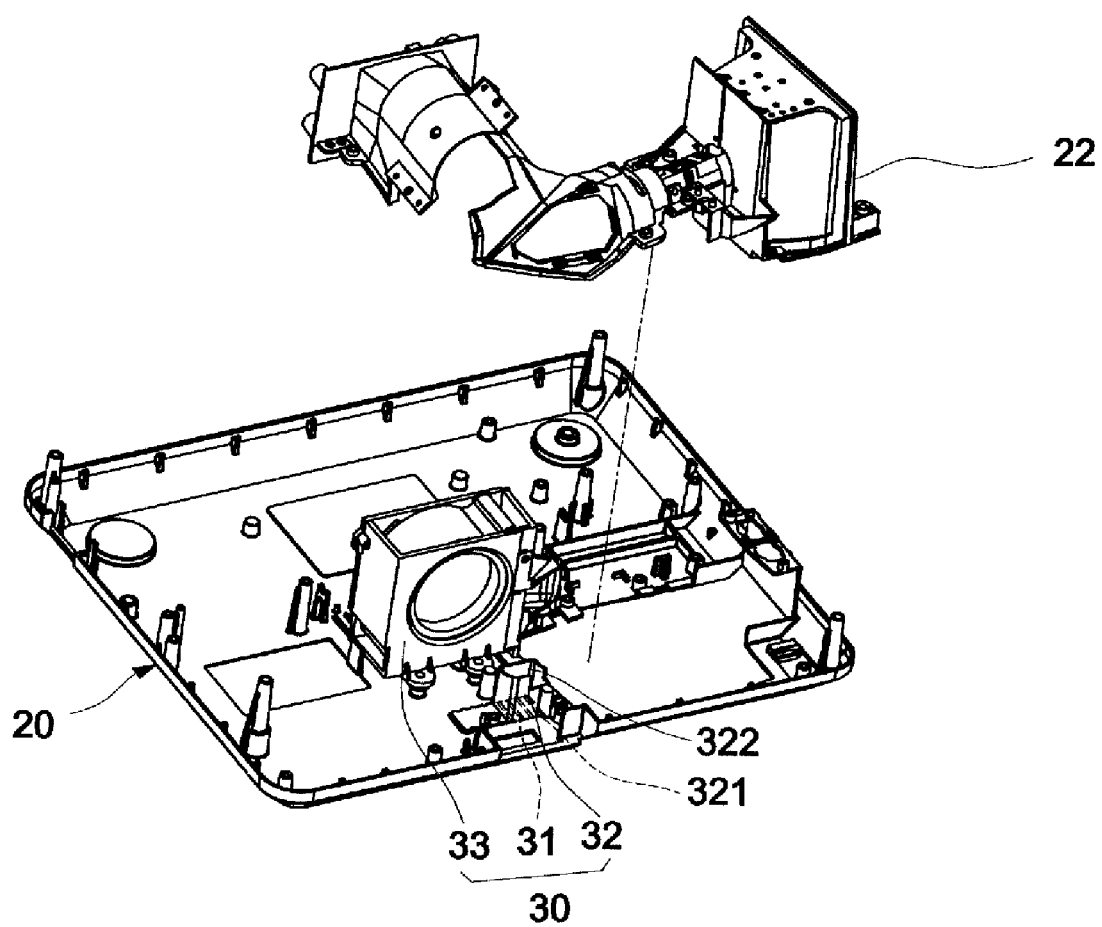
FIG. 5 is an exploded perspective view of intake structure according to the present invention.

Referring now to FIG. 4 and 5, the intake structure of the present invention is installed in a projection apparatus 20, and there are heating elements 21 (for examples, integration rod, relay lens, condenser, electronic components or color wheel, etc.) installed in the optical engine casing 22 of the projection apparatus 20.

Said intake structure 30 includes an intake port 31 an air duct 32 and an exhaust fan 33; wherein the intake port 31 is disposed on the bottom of the projection apparatus 20; the air duct 32 is a hollow pipe of straight air path; the quantity of the air duct 32 to be set depends on the quantity of the heating elements 21 or the different concentrating positions, and the inlet of the air duct 321 is connected to the intake port 31; the area of the intake port 31 to be set depends on the area of the air duct 32 that renders air stream from the intake port 31 to flow concentratively through the air duct 32 into the projection apparatus 20; the outlet of the air duct 32 is disposed as near as possible to the heating element 21 for enhancing direct cooling efficiency. In the present embodiment, the air duct 32 is disposed at the bottom of the heating elements 21 (ex. integration rod) with a short distant (about 1~10 mm); the exhaust fan 33 is disposed near the heating elements 21 to guide outside air stream flowing into the projection apparatus 20 and through the heating element 21.

Figure 6:
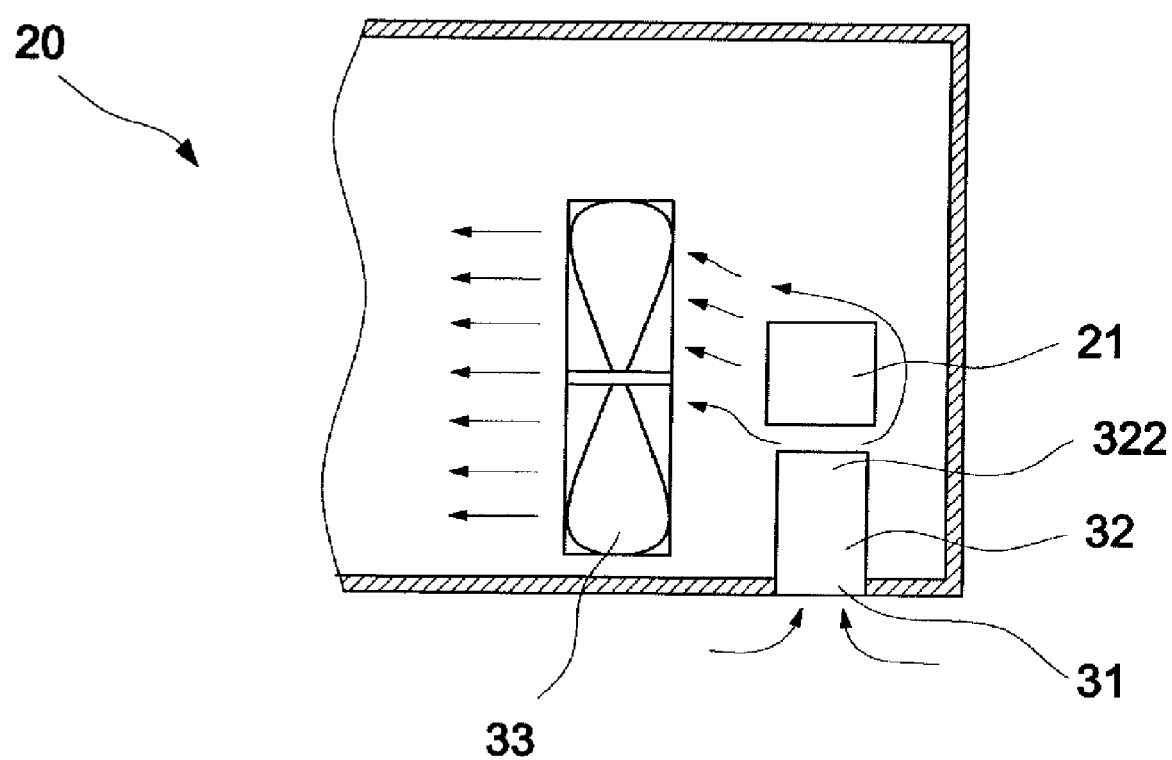
FIG. 6 is an intake structure diagram according to the present invention.

Referring now to FIG. 6, when the exhaust fan 33 is driven, the internal air pressure of the projection apparatus 20 is lower than the external's pressure and causes negative pressure, outside air stream inletting from the intake port 31, guiding into the projection apparatus 20 by the air duct 32 and directly flowing through the heating elements 21 disposed at the outlet 322 of the air duct 32. It changes the thickness of the thermal boundary layer and increases the forced convection to enhance thermal transferring efficiency for cooling heating elements 21 validly. Finally, the exhaust fan brings out the heated air.

Because the air duct 32 concentrates the air stream from the intake port 31 and guides the air stream through the heating elements 21 disposed at the outlet 322 of the air duct 32, it can utilize the way of cross-flow cooling for enhancing cooling efficiency. Thus, the outside air stream will be fulfilled for cooling the heating elements 21 inside the projection apparatus 20. Comparing with the conventional intake structure, the intake structure 30 of the present invention can decrease 20° C. to 30° C. of the heating elements 21 without increasing the area of the intake port 31, the number of the exhaust fans or the rotating speed for enhancing air inletting volume. It maintains the heating elements 21 in allowed temperature condition to make sure of the operating function, reliability and the lifetime not decreased by high temperature.

Besides, by the air duct 32 for concentrating the air stream to increase cooling efficiency and air inletting volume, the area of the intake port 31 can be smaller than that of convention. Thus, defects of escaping light and noise can be reduced.

Figure 7:
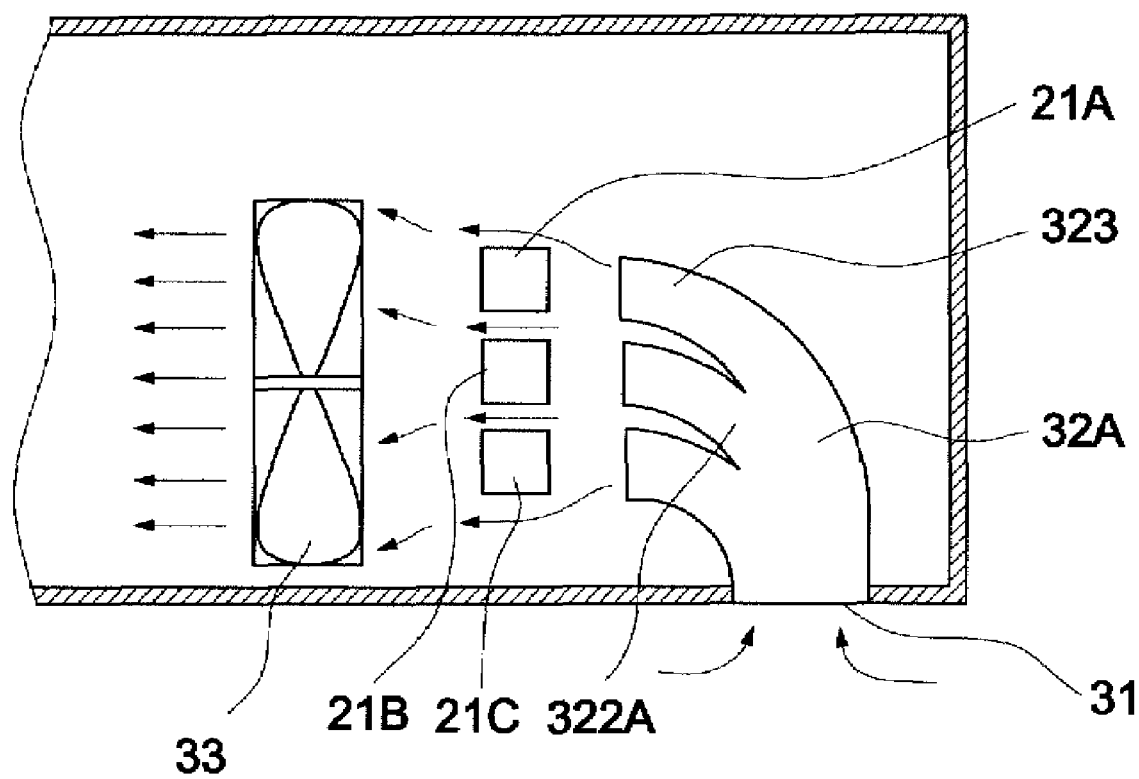
FIG. 7 is the other intake structure diagram according to the present invention.

Referring now to FIG. 7, the air duct 32A can also be a hollow pipe with bent air path for blocking light or noise more efficiency. In the present embodiment, the outlet 322A of the air duct 32A is bent vertically, and the outlet 322A is connected to plural splitting ducts 323 for guiding air stream to the heating element 21A, 21B and 21C located at different positions. The quantity of the splitting ducts 323 and the distributing positions to be set depend on the heating elements 21. And then, the exhaust fan 33 will bring out the heated air for cooling the heating elements 21.

The foregoing description of the preferred embodiments of this invention has been presented for purposes of illustration and description. Obvious modifications or variations are possible in light of the above teaching. The embodiments were chosen and described to provide the best illustration of the principles of this invention and its practical application to thereby enable those skilled in the art to utilize the invention in various embodiments and with various modifications as are suited to the particular use contemplated. All such modifications and variations are within the scope of the present invention as determined by the appended claims when interpreted in accordance with the breadth to which they are fairly, legally, and equitably entitled.

What is claimed is:

1. An intake structure, installed in a projection apparatus which has at least one heating element, comprising:
   at least one intake port disposed on said projection apparatus;
   at least one air duct, an inlet of said air duct being directly connected to said intake port and an outlet of said air duct being disposed near said heating element; and
   an exhaust fan disposed near said heating element for drawing outside air into said intake port, through said air duct, across said heating element, and exhausting the air passing by said heating element, an intake side of said exhaust fan facing said heating element, said heating element disposed between said outlet of said air duct and said exhaust fan, wherein there are no additional fan elements in an air path between the intake port and the heating element for pushing the air toward the heating element.

2. The intake structure as claimed in claim 1, wherein said air duct has a bent air path.

3. The intake structure as claimed in claim 2, wherein the outlet of said air duct is connected to at least one splitting duct.

4. The intake structure as claimed in claim 1, wherein said air duct has a straight air path.

5. The intake structure as claimed in claim 4, wherein the outlet of said air duct is connected to at least one splitting duct.

6. The intake structure as claimed in claim 1, wherein said exhaust fan is disposed near said heating element and said air duct for guiding outside air stream flowing through said heating element.

7. The intake structure as claimed in claim 1, wherein the area of said inlet of said air duct to be set depends on the area of said intake port.

8. The intake structure as claimed in claim 1, wherein the quantity of said air duct to be set depends on the quantity of said heating element.

9. The intake structure as claimed in claim 1, wherein the distance between said heating element and the outlet of said air duct is 1 to 10 mm.

10. The intake structure as claimed in claim 1, wherein said heating element is an integration rod.

11. The intake structure as claimed in claim 1, wherein said heating element is a relay lens.

12. The intake structure as claimed in claim 1, wherein said heating element is a condenser.

13. The intake structure as claimed in claim 1, wherein said heating element is an electronic component.

14. The intake structure as claimed in claim 1, wherein said heating element is a color wheel.

* * * * *